(12) United States Patent
Zhang et al.

(10) Patent No.: US 8,718,714 B2
(45) Date of Patent: May 6, 2014

(54) SETTINGS SYSTEM AND METHOD FOR MOBILE DEVICE

(75) Inventors: Bo Zhang, San Jose, CA (US); Bing Xia, Freemont, CA (US); Ruifeng Xu, Mountain View, CA (US); Kuniaki Tran, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 775 days.

(21) Appl. No.: 11/552,774

(22) Filed: Oct. 25, 2006

(65) Prior Publication Data

US 2008/0102899 A1    May 1, 2008

(51) Int. Cl.
 *H04B 1/38*    (2006.01)
(52) U.S. Cl.
 USPC ........................................... 455/566
(58) Field of Classification Search
 USPC .......... 714/720, 744; 345/619, 661, 173, 625, 345/67.1, 168, 24, 473; 715/233; 455/566, 455/424, 425, 456.5, 456.6, 561, 550.1, 455/575.1, 418–420, 145, 158.4, 344
 See application file for complete search history.

(56) References Cited

U.S. PATENT DOCUMENTS

| | | | |
|---|---|---|---|
| 6,211,870 B1 * | 4/2001 | Foster | 715/744 |
| 6,222,551 B1 * | 4/2001 | Schneider et al. | 345/419 |
| 6,766,311 B1 * | 7/2004 | Wall et al. | 706/46 |
| 6,825,858 B2 * | 11/2004 | Sato | 715/735 |
| 7,383,040 B2 * | 6/2008 | Tolbert, II | 455/425 |
| 7,479,949 B2 * | 1/2009 | Jobs et al. | 345/173 |
| 7,502,036 B2 * | 3/2009 | Kramer et al. | 345/629 |
| 7,512,402 B2 * | 3/2009 | Narayanaswami et al. | 455/420 |
| 2003/0095095 A1 * | 5/2003 | Pihlaja | 345/156 |
| 2003/0211865 A1 * | 11/2003 | Azami et al. | 455/557 |
| 2003/0222833 A1 * | 12/2003 | Nakai | 345/1.1 |
| 2004/0266454 A1 * | 12/2004 | Nielsen et al. | 455/456.1 |
| 2005/0079895 A1 * | 4/2005 | Kalenius et al. | 455/566 |
| 2005/0176454 A1 * | 8/2005 | Chakraborty et al. | 455/518 |
| 2006/0044106 A1 * | 3/2006 | Hirose et al. | 340/3.54 |
| 2006/0122980 A1 * | 6/2006 | He et al. | 707/3 |
| 2006/0170687 A1 * | 8/2006 | Nakamura et al. | 345/473 |
| 2006/0174215 A1 * | 8/2006 | Yan et al. | 715/825 |
| 2006/0197753 A1 * | 9/2006 | Hotelling | 345/173 |
| 2006/0250358 A1 * | 11/2006 | Wroblewski | 345/157 |
| 2007/0021107 A1 * | 1/2007 | Veige | 455/414.1 |
| 2007/0287506 A1 * | 12/2007 | Kim et al. | 455/566 |
| 2008/0139116 A1 * | 6/2008 | Balgard et al. | 455/41.2 |
| 2008/0320172 A1 * | 12/2008 | Kruglikov et al. | 709/248 |
| 2009/0061841 A1 * | 3/2009 | Chaudhri et al. | 455/420 |
| 2009/0158190 A1 * | 6/2009 | Higginson | 715/773 |

\* cited by examiner

*Primary Examiner* — David Bilodeau

(57) ABSTRACT

A handset is provided. The handset comprises a data input component, a display screen, and a processor. The processor is programmed to display a model of the handset on the display screen. The model comprises a plurality of virtual components. At least one of the virtual components is selectable by an input into the data input component and is operable, when selected, to promote a display of information related to the virtual component.

20 Claims, 5 Drawing Sheets

SETTINGS SYSTEM AND METHOD FOR MOBILE DEVICE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Handheld electronic devices such as mobile telephones, personal digital assistants, handheld computers, and similar devices will be referred to herein as handsets. Traditional handsets typically have a menu system that allows the adjustment of settings such as the ring tone, the screen saver, the camera settings, the soft key assignments, the roaming mode, and other adjustable features commonly found on handsets. As the number of features offered by traditional handsets has increased, the menu systems providing access to the settings for the features have become more complex. Many handset users might be unable or unwilling to navigate through a complicated menu system to find a menu item that allows the adjustment of a setting. Therefore, the users may never make changes to features that could be customized to match their preferences. Some users may not even be aware that modifications can be made to certain features or may not be aware that certain features even exist.

In addition, there is sometimes no way of knowing the effect that the adjustment of a setting will have until after the adjustment has been made. If the adjustment of a setting does not have the desired effect, the user may need to navigate through the menu system to find the menu item that allowed the adjustment and undo the setting change. On a complex menu system, the process of finding the menu item, making the adjustment, finding the menu item again, and reversing the adjustment might be so laborious that it discourages users from ever attempting to adjust certain features.

SUMMARY

In one embodiment, a handset is provided. The handset comprises a data input component, a display screen, and a processor. The processor is programmed to display a model of the handset on the display screen. The model comprises a plurality of virtual components. At least one of the virtual components is selectable by an input into the data input component and is operable, when selected, to promote a display of information related to the virtual component.

In another embodiment, a method for adjusting a setting of a device is provided. The method comprises causing a model of the device to appear on a display of the device, selecting a portion of the model, causing to appear on the display of the device a plurality of options related to a component of the device associated with the portion of the model, selecting at least one of the options, and adjusting a setting of the component of the device based on the selection of the option.

In another embodiment, a computer readable medium is provided. The computer readable medium includes instructions that, when executed by a processor, are operable to execute a method. The method comprises displaying a graphical user interface (GUI) to a display of a device and the GUI displaying a virtual model of the device. The virtual model includes a plurality of selectable virtual components associated with actual components of the device such that selection of the virtual components promotes adjustment of a setting of the actual components.

These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with the accompanying drawings and detailed description, wherein like reference numerals represent like parts.

DETAILED DESCRIPTION

Figure 1:
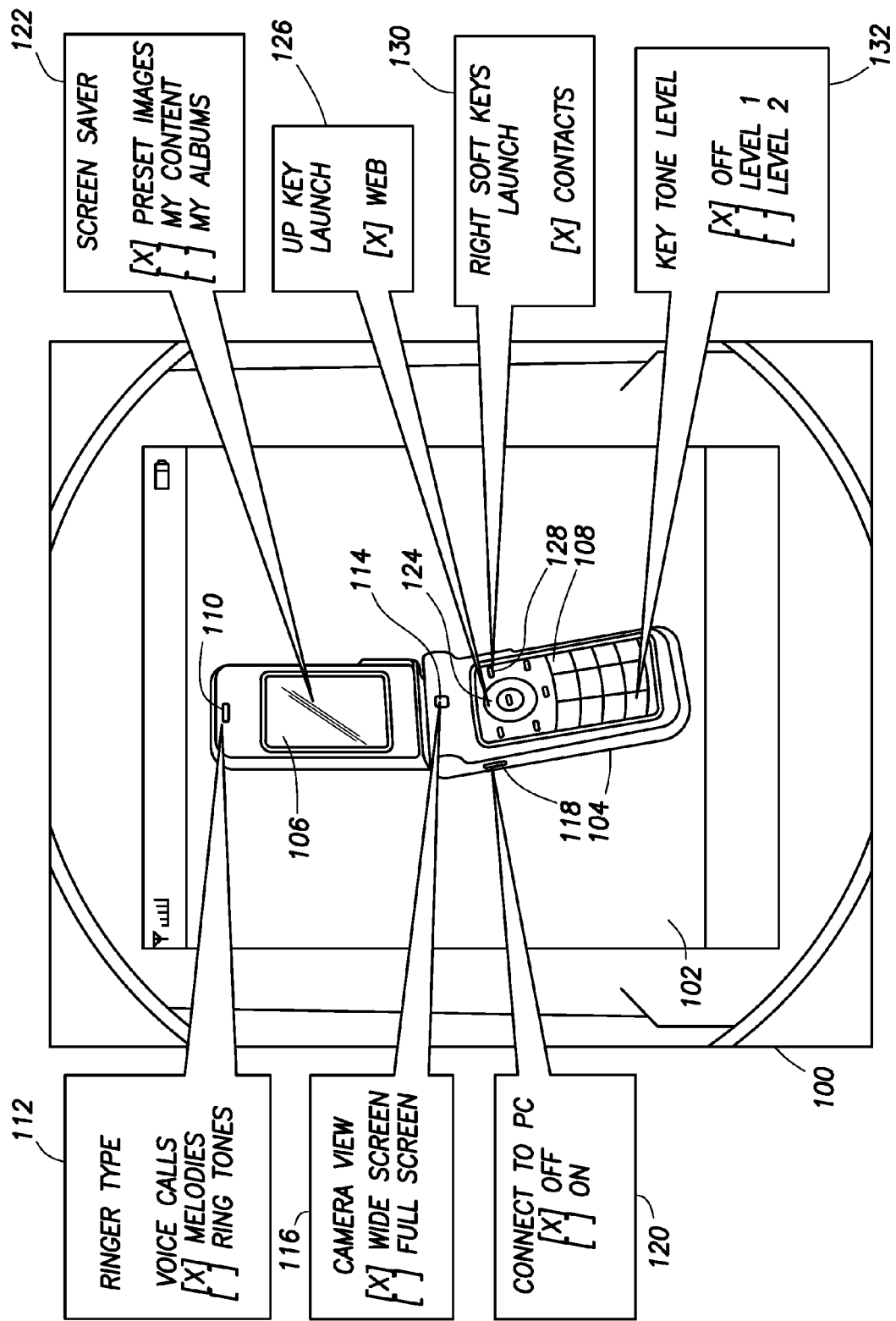
FIG. 1 illustrates a view of a graphical user interface shown on a display of a handset according to an embodiment of the disclosure.

It should be understood at the outset that although an illustrative implementation of one embodiment of the disclosure is illustrated below, the system may be implemented using any number of techniques, whether currently known or in existence. The disclosure should in no way be limited to the illustrative implementations, drawings, and techniques illustrated below, including the exemplary design and implementation illustrated and described herein, but may be modified within the scope of the appended claims along with their full scope of equivalents.

In an embodiment, a graphical user interface on the display screen of a handset can depict a model of that handset. The model can have a three-dimensional appearance and other attributes that make the model appear substantially identical to the actual handset. Each adjustable component in the actual handset might be represented by a corresponding virtual component in the model. The user of the handset can use navigation keys or other handset input devices to highlight the virtual components. Selecting a highlighted virtual component can allow the adjustment of the settings for the actual component that corresponds to the virtual component. For example, selecting a speaker in the model might allow adjustments to the handset ring tone, selecting the display screen in the model might allow adjustments to the handset screen saver, and selecting a camera button in the model might allow adjustments to the handset camera settings.

The navigation keys or other input devices on the handset might also be used to rotate the model or magnify the model so that components not previously visible in the model can be brought onto view. For example, if a front view of the model is currently displayed on the graphical user interface of the handset's display screen, the model could be rotated to bring the rear portion of the model into view. A user could zoom in on the model to make the virtual components appear larger. For a clamshell-type handset, the navigation keys or other input devices could cause the model to appear to open and close.

The model can be called up on the handset's display screen in several different manners. In one embodiment, a 'settings' menu item might be selected from a traditional menu. In other embodiments, a dedicated settings button or a soft key for settings might be present on the handset and might be pressed to cause the model to appear on the display screen. As is well known in the art, a soft key is a button that has no permanently assigned function but can perform different tasks depending on the context that is currently active on the handset. The function that the soft key performs might be indicated by a label that appears above the soft key on the display screen. In another embodiment, a settings icon on the display screen might be selected to bring up the model. Other ways of causing the model of the handset to appear on the display screen of the handset will be apparent to one of skill in the art.

Once the model has been brought up on the handset display screen, highlighting of the components on the model might be done in several different ways. In one embodiment, the arrow keys or similar keys on the handset keypad could be used to traverse through the components in the model. That is, the virtual components might be accessible in a series so that repeatedly pressing an arrow key or similar key on the actual handset sequentially highlights each of the virtual components. In another embodiment, the display screen of the handset might be touch-sensitive and a virtual component could be highlighted by touching the screen in the location where the virtual component appears. In yet another embodiment, dedicated shortcut keys could be present on the actual handset for various handset components and pressing one of the shortcut keys could highlight the corresponding virtual component. Other ways of highlighting the virtual components will be apparent to one of skill in the art.

Once a virtual component has been highlighted, the highlighted virtual component could be selected for adjustment of its settings in several different manners. In one embodiment, an 'OK' button or similar button on the handset keypad could be pressed. In another embodiment, the dedicated settings button or the soft key for settings that was previously pressed to cause the model to appear on the display screen might be pressed again to select a highlighted virtual component.

In yet another embodiment, the handset might include a voice recognition system that can accept voice commands for the selection of virtual components. For example, saying the word 'speaker' might allow adjustments to the handset ring tone or saying the word 'display' might allow adjustments to the handset screen saver. Alternatively, saying a word or phrase while a virtual component is highlighted, might cause sub-menus related to that virtual component to appear. For example, if the display screen is highlighted, saying the phrase 'screen saver' might allow adjustments to the handset screen saver, saying the word 'wallpaper' might allow adjustments to the handset wallpaper, and saying the word 'backlight' might allow adjustments to the handset backlight.

Other ways of selecting a highlighted virtual component will be apparent to one of skill in the art. Also, while the highlighting of a virtual component and the selecting of that virtual component have been described as separate actions, it should be understood that a single action could select a virtual component for the adjustment of the settings of its corresponding actual component.

When a virtual component has been selected, several different types of interfaces might appear on the actual handset display screen to allow the adjustment of settings for the actual component that corresponds to the selected virtual component. In one embodiment, a list of menu items similar to the lists that appear in typical two-dimensional menus might appear. Navigation keys or other input devices on the actual handset might be used to navigate through the list and select a menu item. Selecting a menu item might allow the adjustment of a setting or might bring up a sub-menu of additional menu items for modifications of settings.

Alternatively, a menu interface with a three-dimensional appearance might be displayed when a virtual component is selected. The user might be able to use navigation keys or other input devices to rotate and zoom in on this three-dimensional menu and to select menu items that appear on the surface of the three-dimensional object. Other types of interfaces that might appear on the actual display screen for adjusting the settings of the handset will be apparent to one of skill in the art.

A user can make an adjustment to a setting by modifying an item that appears in a settings adjustment menu or in another settings adjustment interface. The effect of the adjustment can be applied to the model of the handset before being applied to the actual handset. In this way, the user might be able to determine whether the adjustment will have the desired effect before committing to the adjustment on the actual handset. For example, if the user wished to change the background wallpaper for the actual handset display screen, the user might first observe how the new wallpaper appears on the model of the handset. If the user is satisfied with the effect of the setting adjustment as shown on the model of the handset, the user might accept the adjustment and the corresponding adjustment will be applied to the actual handset. If the effect of the setting adjustment on the model of the handset is unacceptable to the user, the user might discard the adjustment and no changes will be applied to the actual handset.

A user may not be familiar with all of the features of a handset and therefore may be unable to identify all of the virtual components on the model of the handset. To assist the user in determining the function represented by a virtual component, an icon, text, or some other identifier may appear on or near the virtual component to identify the virtual component. Identifiers for each visible virtual component may be displayed whenever the model is displayed or, alternatively, an identifier may be displayed only when its corresponding virtual component is highlighted.

An icon, text, or some other identifier may also appear on the actual display screen to indicate the presence of virtual components that are not visible in the view of the model currently depicted on the display screen. For example, if a front view of the model is shown on the display screen, virtual components that are on the rear side of the handset would not be visible on the model. In such a case, identifiers for the virtual components on the rear of the handset might appear on the display screen of the actual handset. If the user wished to adjust a setting related to one of the virtual components on the rear of the handset, the user might cause the model to rotate so that the rear of the handset becomes visible and then might select the desired virtual component in one of the manners described above. Alternatively, the user might be able to select the desired virtual component by selecting the identifier associated with the virtual component without the need to rotate the model.

Some features of a handset might not have any corresponding visible external components on the handset and therefore no virtual components related to the features can be depicted on the model of the handset. For example, a handset might have the capability for a Bluetooth connection but there may be no element on the exterior of the handset that is associated with the handset's Bluetooth capability. In such cases, a logo, an icon, text, or some other identifier might be displayed on the handset's display screen to allow the adjustment of the settings of features for which no virtual components appear anywhere on the model. For example, whenever the handset model appears on the actual handset's display screen, a Bluetooth logo might also appear on or near the handset model. Selecting the Bluetooth logo might cause the display of a menu that permits adjustments to Bluetooth settings.

Alternatively, a voice recognition system such as that described above can allow the adjustment of the settings of features for which no virtual components appear on the handset model. For example, if a user says the word 'Bluetooth', a menu for setting Bluetooth features might appear.

In addition to or as an alternative to allowing the adjustment of settings on a handset, selection of a virtual component might cause help information to be displayed on the actual handset's display screen. If a user is uncertain of the function that a handset component performs, the user could select the corresponding virtual component and read the help information that appears for that handset component. For example, a handset might include a connection port, the purpose of which is not apparent to the user. The user could select the corresponding virtual connection port in the handset model and a text description might appear stating that the port is, for example, a USB port. The description might include further information about the types of devices that can be connected to a USB port, the types of data that can be transmitted through a USB connection, and other USB-related information.

If an action that can be taken on a handset involves some other item, that item might appear on the handset's display screen along with the model of the handset. For example, a user might wish to connect a handset to a desktop computer via a USB port. If the user is uncertain about how to make such a connection, the user might select the USB port in the handset model. A model of a USB cable might then appear on the actual handset's display screen and the proper mode of connection of the cable to the handset might be depicted. A model of the computer might also appear and the proper mode of connection of the cable to the computer might be depicted.

The model of the handset or of some other item that might appear with the handset model can be animated to demonstrate to the handset user the proper procedure for carrying out some action. For example, in the case where the user is attempting to connect a USB cable to a handset and a computer, one end of the cable might be shown with its proper orientation and might appear to move toward the USB port on the handset and the other end of the cable might be shown with its proper orientation and might appear to move toward the USB port on the computer.

FIG. 1 illustrates an embodiment of a display screen 102 of a handset 100 on which a model 104 of that handset 100 is depicted. Only a portion of the handset 100 is shown in the current figure. In the figure, multiple menus are displayed to give examples of some of the features whose settings might be adjusted through manipulation of the model 104. For the sake of clarity in the drawing, the menus are shown outside the handset display screen 102 but it should be understood that the menus would actually appear within the handset display screen 102. Also, it should be understood that all of these menus would not necessarily appear on the handset display screen 102 simultaneously. In some embodiments, only a menu related to a selected virtual component would appear.

In the embodiment of FIG. 1, the virtual handset 104 appears to be open to reveal a virtual display screen 106 and a virtual keypad 108. When a speaker 110 on the virtual handset 104 is selected, a 'ringer type' menu 112 might appear for adjusting ring tones. In this example, a 'melodies' option and a 'ring tones' option are available and the 'melodies' option has been selected. When a camera button 114 or other camera-related item on the virtual handset 104 is selected, a 'camera view' menu 116 might appear for adjusting the screen of the handset's camera. In this example, a 'wide screen' option and a 'full screen' option are available and the 'wide screen' option has been selected.

When a USB port 118 or a similar data port on the virtual handset 104 is selected, a 'connect to PC' menu 120 might appear with options for turning a PC connection on or off. In this example, the PC connection has been turned off. When the virtual display screen 106 is selected, a 'screen saver' menu 122 might appear for specifying the actual handset's screen saver. In this example, a 'preset images' option, a 'my content' option, and a 'my albums' option are available and the 'preset images' option has been selected.

When an 'up' key 124 on the virtual keypad 108 is selected, an 'up key' menu 126 might appear for specifying the function that the 'up' key 124 will perform. In this example, the 'up' key 124 has been designated to launch a web browser. When a 'right soft' key 128 on the virtual keypad 108 is selected, a 'right soft key' menu 130 might appear for specifying the function that the 'right soft' key 128 will perform. In this example, the 'right soft' key 128 has been designated to launch a contacts application. For either of these keys, or for other keys on the virtual keypad 108, additional options could be available for the functions that the corresponding keys on the actual keypad can perform.

When a standard alphanumeric key or other key on the virtual keypad 108 is selected, a 'key tone level' menu 132 might appear for specifying the level of the sound that will be heard when a standard key is pressed. In this example, an 'off' option, a 'level 1' option, and a 'level 2' option are available and the 'off' option has been selected.

Figure 2:
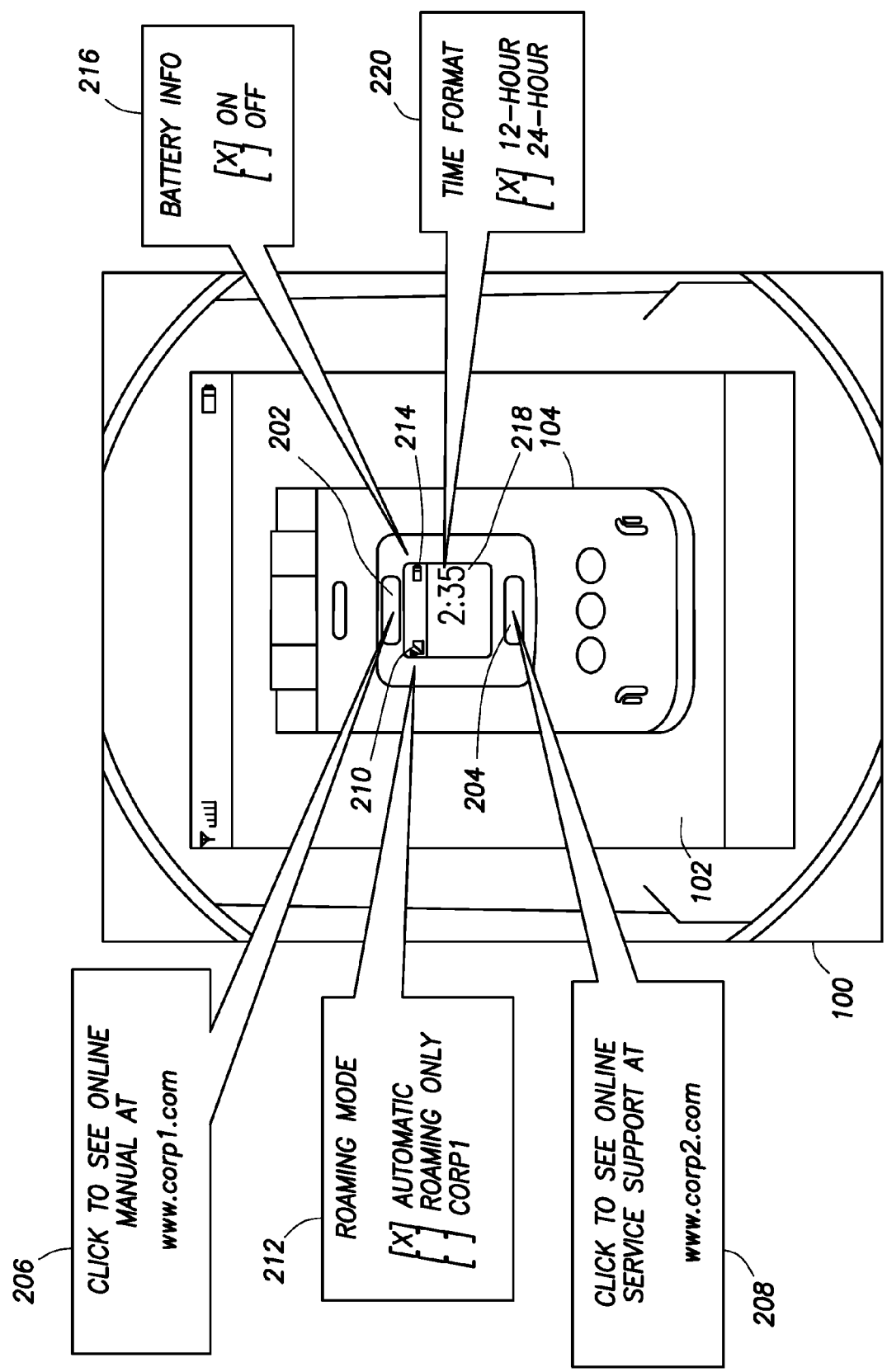
FIG. 2 illustrates another view of a graphical user interface shown on a display of a handset according to an embodiment of the disclosure.

FIG. 2 illustrates an embodiment of another view of the virtual handset 104 on the display screen 102 of the actual handset 100. In this view the virtual handset 104 is closed and the cover of the virtual handset 104 is shown. Again, several menus that would actually appear within the handset display screen 102 are shown outside the handset display screen 102 and it should again be understood that all of these menus would not necessarily appear on the handset display screen 102 simultaneously.

When a logo 202 of the manufacturer of the handset 100 is selected, a web browser on the handset might display a home web page, a support web page, or a similar web page for the manufacturer. Similarly, when a logo 204 of the telecommunications service provider for the handset 100 is selected, the web browser might display a home web page, a support web page, or a similar web page for the service provider. If the logo 202 or the logo 204 is highlighted but not selected, a first text box 206, a second text box 208, or some other type of display might show the Uniform Resource Locator (URL) and a brief description of the web page that will be displayed if the logo 202 or the logo 204 is selected. Alternatively, help information stored internally in the actual handset 100 might be displayed or some other action might occur when a logo or other company identifier is selected on the virtual handset 104.

If the handset cover has an indicator of the handset's current roaming mode, selecting the roaming mode indicator on the virtual handset 104 might cause the display of a menu that allows the adjustment of roaming mode settings. In the example of FIG. 2, a roaming mode indicator 210 has been selected and a 'roaming mode' menu 212 has appeared. The 'roaming mode' menu 212 options are 'automatic', 'roaming only', and 'Corp1', and 'automatic' has been chosen.

Selecting a battery level indicator on the virtual handset 104 might cause the display of a menu that allows detailed battery level information to be turned on or off. In the example of FIG. 2, a battery level indicator 214 has been selected and a 'battery info' menu 216 has appeared. The 'battery info' menu 216 options are 'on' and 'off', and 'on' has been chosen. Selecting a clock on the virtual handset 104 might cause the display of a menu that allows the adjustment of the time format for the clock. In the example of FIG. 2, a clock 218 has been selected and a 'time format' menu 220 has appeared. The 'time format' menu 220 options are '12 hour' and '24 hour', and '12 hour' has been chosen.

Again, it should be understood that the handset features described above and the menus that appear when the virtual components corresponding to those features are selected are intended to be examples only. In other embodiments, other settings of other features could be adjustable through a virtual handset that appears in a graphical user interface on the display screen of an actual handset. Other menu items could be listed and interfaces other than menus could be used for adjusting the settings. Also, identifiers for virtual components not visible in the views of FIGS. 1 and 2 or for features that have no corresponding virtual components are not shown in those figures. Examples of animated items that might appear on the actual display screen are also not shown in the figures.

While the above discussion has focused on handsets, one of skill in the art will recognize that other devices could display a model of the device for the purpose of making adjustments to the settings of the device. For example, a model of a laptop computer or of a desktop computer could be displayed on the computer's display screen and a user could manipulate the model to modify the features of the computer.

The use of a model of a device to make adjustments to the settings of the device can be simpler than navigating through a complex menu system to adjust the settings. Such a setting adjustment method can allow users of the device to preview the effects of a setting modification, which might, in turn, make the users more likely to experiment with different settings. The users might then make adjustments to features that they otherwise might not adjust or might discover features or settings for features that they did not know existed.

Figure 3:
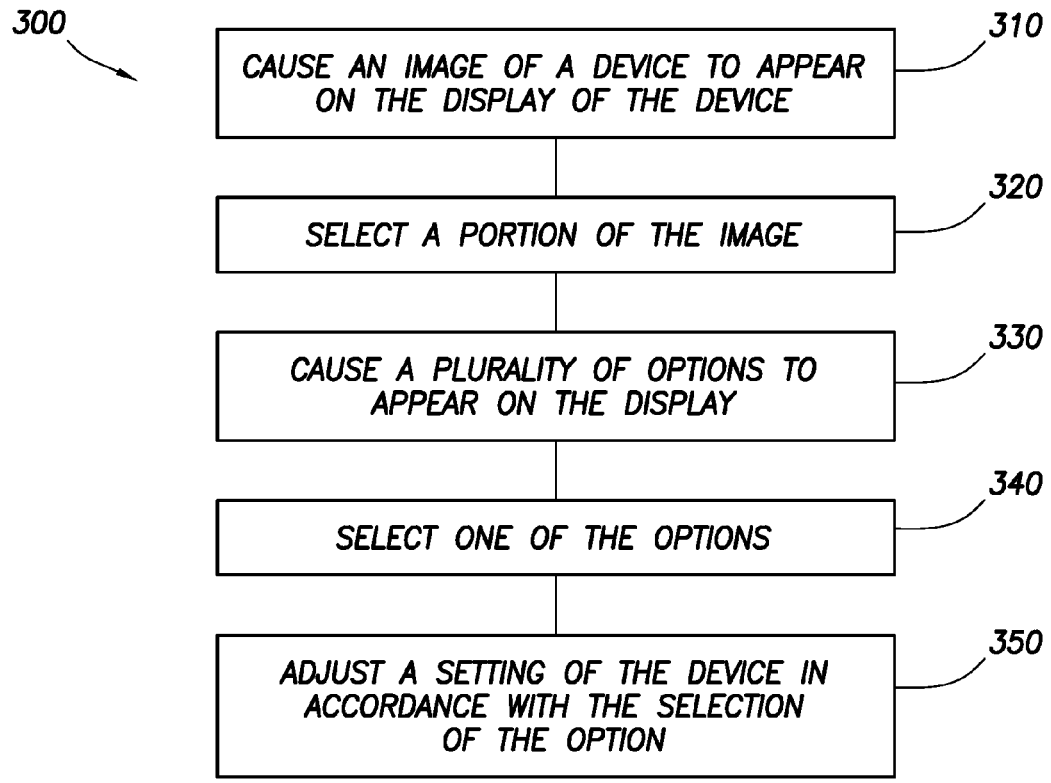
FIG. 3 illustrates a method for adjusting a setting of a device according to an embodiment of the disclosure.

FIG. 3 illustrates a method 300 for adjusting a setting of a device. In box 310, a model of the device is made to appear on the display of the device. In box 320, a portion of the model is selected. In box 330, a plurality of options is made to appear on the display. The options are related to a component of the device that is associated with the portion of the model. At least one of the options is selected in box 340. In box 350, the setting of the device is adjusted in accordance with the selection of the option.

Figure 4:
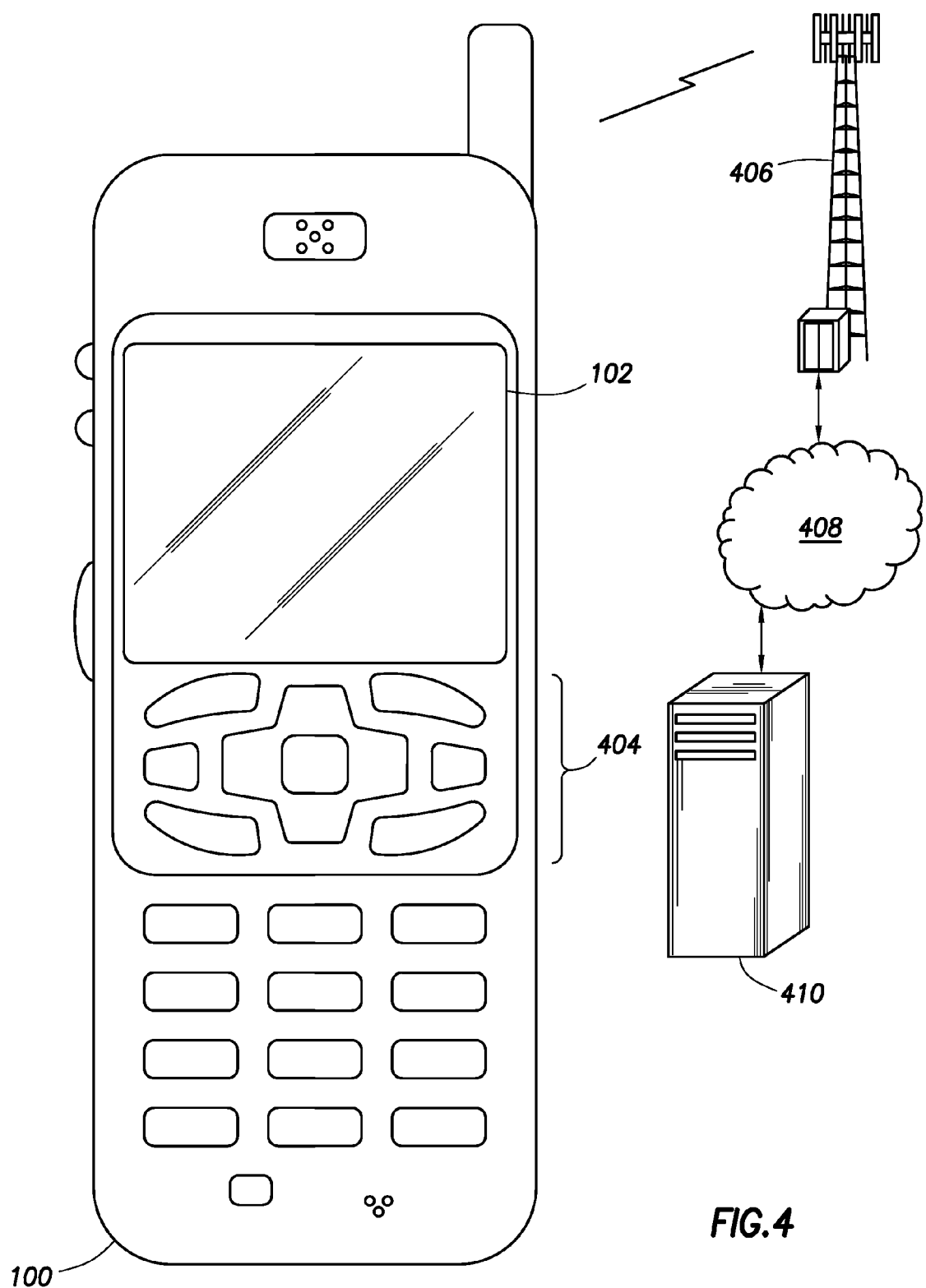
FIG. 4 is a diagram of a wireless communications system including a handset operable for some of the various embodiments of the disclosure.

FIG. 4 shows a wireless communications system including the handset 100. The handset 100 is operable for implementing aspects of the disclosure, such as displaying a model of the handset 100, but the disclosure should not be limited to these implementations. Though illustrated as a mobile phone, the handset 100 may take various forms including a wireless handset, a pager, a personal digital assistant (PDA), a portable computer, a tablet computer, or a laptop computer. Many suitable handsets combine some or all of these functions. In some embodiments of the disclosure, the handset 100 is not a general purpose computing device like a portable, laptop or tablet computer, but rather is a special-purpose communications device such as a mobile phone, wireless handset, pager, or PDA.

The handset 100 includes the display 102 and a touch-sensitive surface or keys 404 for input by a user. The handset 100 may present options for the user to select, controls for the user to actuate, and/or cursors or other indicators for the user to direct. The handset 100 may further accept data entry from the user, including numbers to dial or various parameter values for configuring the operation of the handset 100. The handset 100 may further execute one or more software or firmware applications in response to user commands. These applications may configure the handset 100 to perform various customized functions in response to user interaction.

Among the various applications executable by the handset 100 are a web browser, which enables the display 102 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the handset 100 has access to information on various servers, such as a server 410. The server 410 may provide content that may be shown on the display 102.

Figure 5:
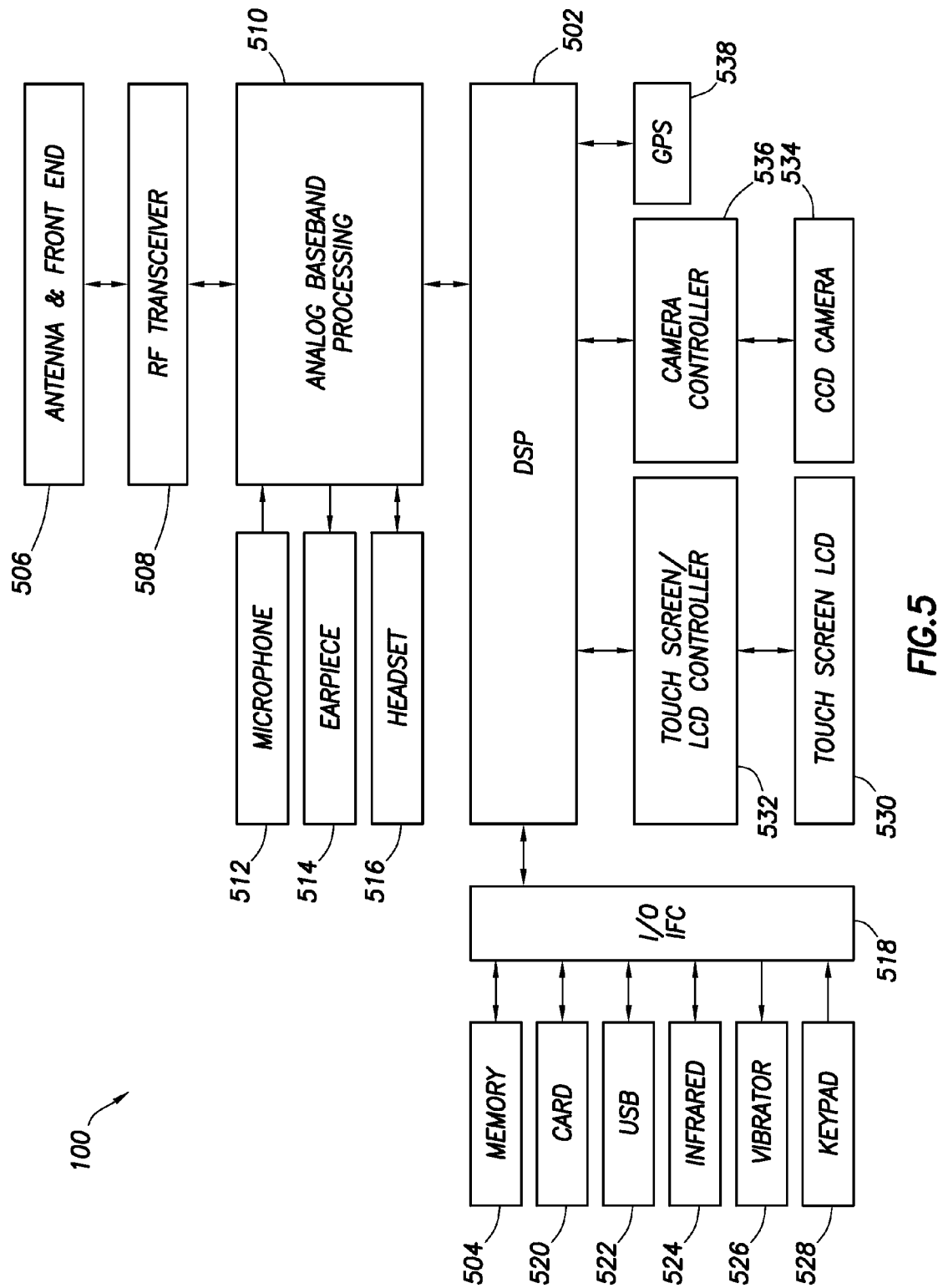
FIG. 5 is a block diagram of a handset operable for some of the various embodiments of the disclosure.

FIG. 5 shows a block diagram of the handset 100. The handset 100 includes a digital signal processor (DSP) 502 and a memory 504. As shown, the handset 100 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the handset 100 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 100 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the handset 100 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 100 to function as a peripheral device to exchange information with a personal computer or other computer system. The infrared port 524 and other optional ports such as a Bluetooth interface or an IEEE 802.11 compliant wireless interface may enable the handset 100 to communicate wirelessly with other nearby handsets and/or wireless base stations.

The input/output interface 518 may further connect the DSP 502 to the vibrator 526 that, when triggered, causes the handset 100 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 100. Another input mechanism may be the touch screen LCD 530, which may also display text and/or graphics to the user. The touch screen LCD controller 532 couples the DSP 502 to the touch screen LCD 530.

The CCD camera 534 enables the handset 100 to take digital pictures. The DSP 502 communicates with the CCD camera 534 via the camera controller 536. The GPS sensor 538 is coupled to the DSP 502 to decode global positioning system signals, thereby enabling the handset 100 to determine its position. Various other peripherals may also be included to provide additional functions, e.g., radio and television reception.

Figure 6:
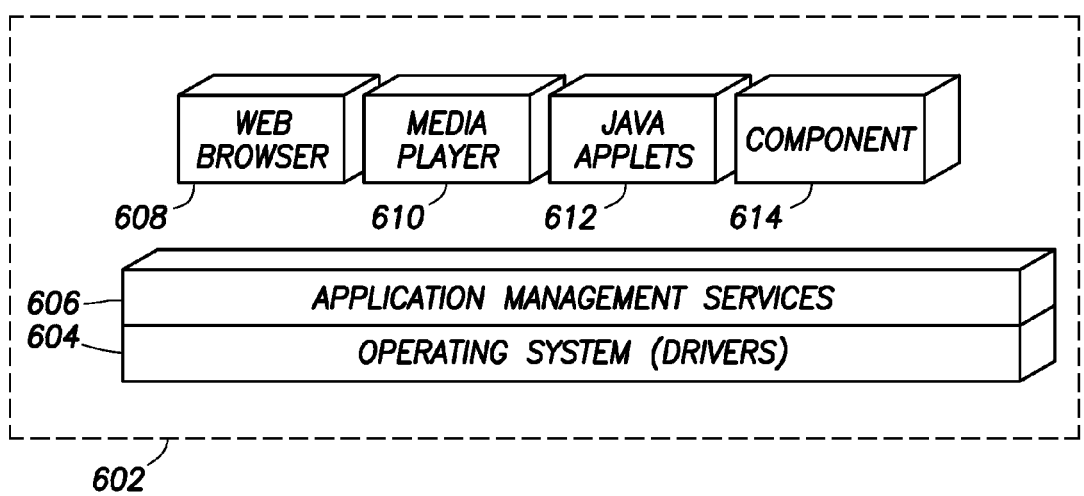
FIG. 6 is a diagram of a software environment that may be implemented on a handset operable for some of the various embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 100. Also shown in FIG. 6 are a web browser application 608, a media player application 610, and Java applets 612. The web browser application 608 configures the handset 100 to operate as a web browser, allowing a user to enter information into forms and select links to retrieve and view web pages. The media player application 610 configures the handset 100 to retrieve and play audio or audiovisual media. The Java applets 612 configure the handset 100 to provide games, utilities, and other functionality. A component 614 might manage the display of the virtual handset and the adjustment of the handset settings via the virtual handset as described herein.

While several embodiments have been provided in the disclosure, it should be understood that the disclosed systems and methods may be embodied in many other specific forms without departing from the spirit or scope of the disclosure. The examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A handset, comprising:
   a data input component;
   a display screen; and
   a processor configured to:
   display a model of the handset on the display screen, the model having a three-dimensional appearance on the display screen that is similar to the handset that displays the model, the model comprising a plurality of virtual components, each virtual component having an appearance similar to a corresponding component of the handset;
   when at least one of the virtual components is selected by an input to the data input component, display an interface of selectable menu options corresponding to adjustable settings of the corresponding component of the handset; and
   in response to receiving an input to the data input component indicating an adjustment to the adjustable settings, adjust the adjustable settings of at least one of the corresponding handset component and the model by changing the adjustable setting from a first displayed menu option in place prior to selecting the at least one virtual component to a second displayed menu option different from the first displayed menu option and not in place prior to selecting the at least one virtual component,
   wherein the model of the handset is configured to be rotated on the display screen to enable viewing of a plurality of sides of the model of the handset, the rotation of the model of the handset revealing at least one selectable virtual component that was not visible before the rotation.

2. The handset of claim 1, wherein the handset component having a corresponding virtual component includes at least one of: a speaker, a camera, a data port, the display screen, a keypad key, a roaming mode indicator, a battery level indicator, and a clock.

3. The handset of claim 2, wherein when the speaker is selected, the interface of selectable menu items corresponding to adjustable settings of the speaker of the handset comprises a ringer type menu including an plurality of ringer options.

4. The handset of claim 1, wherein the at least one virtual component is substantially similar in appearance to the corresponding handset component and is configured to visually model a visual effect of the adjustment of the setting of the corresponding handset component before the adjustment of the setting occurs on the corresponding handset component.

5. The handset of claim 1, wherein the model of the handset is configured to be magnified, wherein the magnification of the model of the handset reveals at least one selectable virtual component that was not visible before the magnification.

6. The handset of claim 1, wherein the plurality of virtual components is configured to be highlighted upon the selection of the at least one of the virtual components by at least one of:
   selection of a key on the data input component, selection of the key causing a highlighting of a different one of the plurality of virtual components;
   a shortcut key on the data input component, the shortcut key associated with one of the plurality of virtual components;
   detection of a touch on a portion of the display screen in a location where the selected at least one of the plurality of virtual components appears; and
   a voice command.

7. The handset of claim 1, wherein, when one of the virtual components is selected, a plurality of options related to the selected virtual component appears on the display screen and a selection of one of the options promotes the adjustment of the setting of the handset component corresponding to the selected virtual component.

8. The handset of claim 1, wherein in response to receiving the input to the data input component indicating the adjustment to the adjustable setting, the adjustment of the setting is configured to be applied to the model of the handset displayed on the display screen before being applied to the handset.

9. The handset of claim 8, wherein the adjustment of the setting applied to the model is not applied to the handset.

10. The handset of claim 1, wherein an identifier is configured to appear on the display screen to indicate a presence of at least one of:
    a component of the handset not visible in the model of the handset; and
    a component of the handset not having a corresponding virtual component.

11. The handset of claim 1, wherein the selected at least one of the virtual components is the display screen; and
    wherein the selectable menu options corresponding to adjustable settings of the display screen comprise a screen saver, a wall paper, and a backlight.

12. The handset of claim 1, wherein the processor is further configured to:
    display an identifier of an internal feature of the handset for which no virtual components appear anywhere on the model, and
    when the identifier is selected by an input to the data input component, an interface of selectable menu options corresponding to adjustable settings of the internal feature, display an interface of selectable menu options corresponding to adjustable settings of the internal feature, and in response to receiving an input to the data input component indicating an adjustment to the adjustable settings of the internal feature of the handset, adjust the adjustable settings at least one of the internal feature.

13. A method comprising:
    causing a model of the device to appear on a display of the device, the model having a three-dimensional appearance on the display that is similar to the handset that displays the model, the model comprising a plurality of virtual components, each virtual component having an appearance similar to a corresponding component of the device;
    receiving a selection of one of the virtual components;
    causing a plurality of selectable menu options corresponding to adjustable settings related to the component of the device corresponding to the selected virtual component to be displayed on the display of the device;
    receiving a selection of at least one of the adjustable settings;
    adjusting a setting of the corresponding component of the device based on the selection of the at least one of the plurality of adjustable settings by changing the setting of the corresponding component of the device from a first displayed menu option in place prior to receiving the selection of the one of the virtual components to a second displayed menu option different from the first displayed menu option and not in place prior to receiving the selection of the one of the virtual components; and
    rotating the model of the device on the display to enable viewing of a plurality of sides of the model of the device and to reveal at least one selectable virtual component that was not visible before the rotation.

14. The method of claim 13, wherein the portion of the model is substantially similar in appearance to the component of the device, the method further comprising modeling an effect of the adjustment of the setting of the corresponding component of the device before the adjustment of the setting occurs on the corresponding component of the device.

15. The method of claim 13, further comprising magnifying the model on the display.

16. The method of claim 13, further comprising applying the adjustment of the setting to the portion of the model before applying the adjustment of the setting to the component.

17. The method of claim 13, wherein the device comprises at least one of: a mobile handset, a laptop computer, a tablet computer, a desktop computer, and a personal digital assistant.

18. A non-transitory computer readable medium including instructions that, when executed by a processor, are operable to perform at least the following:
    displaying a graphical user interface (GUI) to a display of a device, the GUI displaying a model of the device, the model having a three-dimensional appearance on the GUI that is similar to the handset that displays the model, wherein the model includes a plurality of selectable virtual components associated with actual components of the device such that selection of the virtual components displays an interface of selectable menu options corresponding to adjustable settings of the actual components;
    receiving a selection of one of the virtual components;
    upon receipt of the selection of the virtual component, adjusting a setting of the corresponding handset component by changing the adjustable setting from a first displayed menu option in place prior to receiving the selection of the one virtual component to a second displayed menu option different from the first displayed menu option and not in place prior to the selection of the one virtual component; and
    rotating the model of the device on the GUI to enable viewing of a plurality of sides of the model of the device and to reveal at least one selectable virtual component that was not visible before the rotation.

19. The computer readable medium of claim 18, wherein at least one virtual component is substantially similar in appearance to at least one associated actual component.

20. The computer readable medium of claim 18, wherein the device comprises a mobile handset and wherein at least one virtual component comprises at least one of a screen saver and a background wallpaper for the display of the mobile handset and wherein the adjustment of the at least one of the screen saver and the background wallpaper is applied to the model of the device before being applied to the device.

* * * * *